(12) United States Patent
Waite

(10) Patent No.: US 6,531,050 B1
(45) Date of Patent: Mar. 11, 2003

(54) WATER PURIFICATION PROCESS

(75) Inventor: Michael Waite, Gloucestershire (GB)

(73) Assignee: Ionex Limited (GB)

( * ) Notice: Subject to any disclaimer, the term of this patent is extended or adjusted under 35 U.S.C. 154(b) by 0 days.

(21) Appl. No.: 09/936,993

(22) PCT Filed: Mar. 24, 2000

(86) PCT No.: PCT/GB00/01143
§ 371 (c)(1),
(2), (4) Date: Dec. 31, 2001

(87) PCT Pub. No.: WO00/56666
PCT Pub. Date: Nov. 28, 2000

(30) Foreign Application Priority Data

Mar. 24, 1999 (GB) .............................. 9906842

(51) Int. Cl.[7] .............................. C02F 1/461
(52) U.S. Cl. ................. 205/742; 205/759; 205/760
(58) Field of Search ................. 205/742, 759, 205/760

(56) References Cited

U.S. PATENT DOCUMENTS

| 4,586,998 A | 5/1986 | Wood |
|---|---|---|
| 4,770,949 A | 9/1988 | Hashimoto et al. |
| 5,376,240 A | 12/1994 | Kaczur et al. |
| 5,614,078 A * | 3/1997 | Lubin et al. ................ 205/743 |

FOREIGN PATENT DOCUMENTS

| EP | 0659692 | 6/1995 |
| GB | 2038872 | 7/1980 |
| GB | 2051128 | 1/1981 |
| GB | 214660 | 4/1985 |
| JP | 58-107490 | 6/1983 |

OTHER PUBLICATIONS

EP Search Report for Application 9906842.1, Date of Search Jun. 14, 1999.

* cited by examiner

Primary Examiner—Arun Phasge
(74) Attorney, Agent, or Firm—Patrick A. Doody; Hunton & Williams

(57) ABSTRACT

A process for removing nitrate ions from an aqueous solution thereof which comprises passing the solution through an electrochemical cell comprising at least one anode and at least one cathode and passing a current therebetween, wherein the cathode surface (s) comprise rhodium metal.

17 Claims, No Drawings

WATER PURIFICATION PROCESS

The present invention relates to a water purification process in which nitrate ions are removed from an aqueous solution thereof and to a process for the removal and destruction of nitrate ions from water such as ground water or surface water.

The recent widespread use of fertilizers has lead to an increase in the level of nitrates in water. Levels in excess of 50 ppm in drinking water have been linked to health problems such as "Blue Baby Syndrome" and possibly stomach cancer. Furthermore, nitrates are often present in effluent which can be discharged into the water system in concentrated form; such nitrate discharge has been identified as a major cause of algal "bloom" in reservoirs and also inland and coastal water eutrophication. This prevalence of nitrate in the environment has led to legislation limiting the permitted level of, nitrates in treated water and effluent.

Nitrates are currently commonly removed from solution either by ion exchange or reverse osmosis.

In an ion exchange process nitrate-containing solutions (typically containing calcium, magnesium and sodium cations of nitrate, sulphate, chloride and bicarbonate anions) are passed through a column containing an anion exchange resin. When the anion exchange resins are fully loaded with nitrate ions, the resin is regenerated, for example using a solution of brine (sodium chloride). Nitrate ions then exchange with chloride ions in the brine and the resulting sodium nitrate and brine mixture is then discharged as waste.

With reverse osmosis, nitrate solutions pass through a membrane which retains approximately 90% of the nitrate (and other) ions in, typically, 20% of the solution. The resultant concentrated solution of the retained ions must then be discarded.

Other technologies, such as bio-denitrification, are also available for removal of nitrate ions from solution.

A problem associated with known techniques of nitrate removal is that relatively concentrated nitrate solutions are discharged. Furthermore, in the case of ion exchange, fresh regenerative solutions may be required for subsequent use of the ion exchange resins, leading to significant running costs.

Removal of the nitrate ions using electrolysis is also known. For example EP-A-291,330 describes a process for treating ground water containing nitrates, which comprises contacting the water with a ion exchange resin and regenerating the resin with a regenerant, wherein the spent regenerant is subjected to electrolysis. The regenerant may, for example, comprise bicarbonate, chloride or sulphate ions. The electrolysis is carried out in an electrolytic cell containing an anode and a cathode. The material of each electrode is platinised titanium, nickel, stainless steel, copper or graphite. The nitrogen gas which in evolved can simply pass into the atmosphere.

U.S. Pat. No. 3,542,657 describes a method of converting an alkali metal nitrate to an alkali metal hydroxide by passing a solution of the nitrate through an electrolytic cell in which a direct current is imposed between the anode and cathodes in the cell, thereby producing oxygen gas at the anodes and alkali metal hydroxide at the cathodes. Nitrogen gas is also produced a the cathodes. A bipolar cell is preferably used in which the cathodes are copper, lead, tin, iron, silver, cadmium, platinum, cobalt, nickel and alloys thereof or coatings of these on the other metals.

The present invention seek to provide a further process for removing nitrate ions from an aqueous solution thereof using an electrochemical cell.

The present invention provides a process for removing nitrate ions from an aqueous solution thereof which comprises passing the solution through an electrochemical cell comprising at least one anode and at least one cathode and passing a current therebetween, wherein the cathode surface (s) comprise rhodium metal.

It has surprisingly been found that the electrical efficiency of the electrochemical cell wherein the cathode surface(s) comprise rhodium metal is surprisingly better than that of other cells containing cathode surfaces comprising, for example, platinum or nickel.

For example, it has been found that in a conventional bipolar electrical cell in which the anodes and cathodes are both made of titanium coated with a mixture of ruthenium dioxide and titanium dioxide, the electrical efficiency for destroying nitrate ions in a bicarbonate solution is about 40%, with about 12% of nitrate ions being reduced in a single pass through the cell. In the same cell fitted with anodes and cathodes made of nickel, the electrical efficiency is about 35%. However, if a cell comprising anodes made of titanium coated with a mixture of ruthenium dioxide and titanium dioxide and cathodes made of titanium electroplated with rhodium, the electrical efficiency is about 49% and about 24% of nitrate ions are reduced in a single pass through the cell. The exact values will, of course, depend on the cell dimensions and operating conditions.

The process of the present invention can be used to remove either partially or completely, nitrate ions from any aqueous solution thereof. However, it is preferred that the aqueous solution is one which has been obtained from the regeneration of an ion exchange column. The ion exchange column may, for example, have been used to purify water, especially ground water or surface water, which contains nitrate ions. The nitrate ions may be present in the solution treated by the ion exchange column in a concentration of, for example, from 15 to 1000 ppm, preferably 15 to 500 ppm. The ground water or surface water which may be treated can subsequently be used as drinking water. The maximum permitted nitrate level in drinking water is generally limited to 50 ppm (as nitrate) as a global standard.

The aqueous solution of nitrate ions treated in the electrochemical cell may also comprise further anions, for example, hydroxide ions, bicarbonate ions and chloride ions. It may also contain cations such as hydrogen, sodium or potassium. The electrochemical cell itself is well known and is described, for example, in U.S. Pat. No. 3,542,657. However, it is essential that the cathode surface(s) comprise rhodium retail.

The cathode may, for example, simply consist of rhodium metal, although this is expensive. Accordingly it is preferred to coat a cathode substance with rhodium metal, for example by electroplating. The thickness of the coating is desirably 0.1 $\mu$m to 0.75 $\mu$m, for example 0.5 $\mu$m to 0.75 $\mu$m.

The cathode substrate may, for example, comprise a metal such as titanium. It nay also comprise an intermediate coating layer under the rhodium metal coating, for example to facilitate the rhodium coating process and to reduce the amount of rhodium used in view of its expense. Thus, for example, the cathode substrate may comprise titanium or titanium coated with titanium dioxide, ruthenium dioxide, iridium. dioxide and/or gold. Many cathode substrates are commercially available.

The anode may be any appropriate anode. Suitable anodes are known to those skilled in the art. The anode surface may be coated with metals or metal oxides which promote the generation of chlorine over oxygen evolution. Thus, for example, the anode may comprise a metal such as titanium, optionally coated with a metal or metal oxide.

Examples of metals are platinum, ruthenium and iridium. Examples of metal oxides are titanium dioxide, ruthenium dioxide, oxides of platinum and iridium and mixed oxides of these metals. Advantageously, the anode surface does not comprise rhodium metal so as to avoid undesirable back-reactions.

In a bipolar cell configuration one side of an intermediate electrode functions as a cathode, whereas the other side functions as an anode. In this case the cathode side is coated with the rhodium metal.

Desirably all of the cathode surfaces in the electrochemical cell comprise rhodium metal. However, this is not an essential feature and only some of the surfaces need comprise rhodium metal. Desirably at least 75% and preferably 100% of the cathodes comprise rhodium metal on their surfaces. Desirably the entire surface of each cathode comprises rhodium metal.

The electrochemical cell is suitably operated at elevated temperature, i. e. at a temperature above room temperature (20° C.). For instance it may be operated at a temperature of at least 60° C., Preferably 60° C. to 70° C., more preferably at a temperature of about 65° C. We have found that the efficiency of the reduction of nitrate ions to nitrogen gas increases with increasing temperature. Suitable heat exchange means may be provided to heat the aqueous solution entering the electrochemical cell using the heat of the aqueous solution exiting the electrochemical cell.

The decomposition of the nitrate ions in the electrochemical cell follows the formulae given in U.S. Pat. No. 3,542,657. Thus the decomposition of nitrate ions in the electrochemical cell is balanced by the formation of hydroxide ions. If the aqueous solution exiting the electrochemical cell is used for any further purpose, the solution may be further treated to remove the hydroxide ions if this in appropriate, for example by the addition of an acid such as hydrochloric acid to neutralise the hydroxide ions.

Desirably the process for removing nitrate ions according to the present invention is used for the removal and destruction of nitrate ions from a solution obtained from the regeneration of an ion exchange column. The ion exchange column can itself have been used to remove nitrate ions from water such as ground water or surface water.

Thus the present invention can also provide a process for the removal and destruction of nitrate ions from water which comprises:

i) passing the water through an ion exchange column (a) containing nitrate selective anion exchange resin to exchange the nitrate ions with bicarbonate and/or chloride ions; and ii) destroying the nitrate ions and regenerating the ion exchange column (a) by:

a) reliving from the ion exchange column (a) any cations which form insoluble hydroxides or carbonates;

b) passing an aqueous solution comprising bicarbonate and/or chloride ions through the ion exchange column (a) to exchange the nitrate ions with bicarbonate and/or chloride ions;

c) passing the solution from step (b) through an electrochemical cell to convert the nitrate ions to nitrogen gas by a method as defined above;

d) replenishing the solution from step (c) by adding bicarbonate and/or chloride ions thereto; and e) recycling the solution from step (d) to step (b).

The water is passed through the ion exchange column (a) to exchange nitrate ions with bicarbonate and/or chloride ions. The water may, of course, undergo pre- or post-processing if other impurities, such as organic materials, are present.

When the water is passed through the ion exchange column (a) the nitrate ions in the water are replaced with bicarbonate and/or chloride ions and the anion exchange resin is loaded with nitrate ions. The anion exchange resin is a nitrate selective resin which exchange nitrate ions with bicarbonate or chloride ions. Examples of suitable resins are Purolite A520E supplied by Purolite International Limited and IMAC HP555, supplied by Rohm & Haas Limited.

Eventually the ion exchange resin will become fully loaded with nitrate ions. At this time the nitrate ions must be removed from the anion exchange column (a) and destroyed and the ion exchange resin regenerated so that the anion exchange column (a) can be used again in the process.

As an initial step any cations which form insoluble hydroxides or carbonates must be removed from the ion exchange column (a). These are mostly $Mg^{++}$ and $Ca^{++}$. The cations may be removed by any appropriate method. Preferably, however, they are simply displaced by passing a volume of softened water through the ion exchange column (a).

An aqueous solution comprising bicarbonate and/or chloride ions is then passed through the ion exchange column (a) to exchange the nitrate ions with bicarbonate and/or chloride ions. A suitable solution comprising bicarbonate ions is a solution comprising sodium or potassium bicarbonate. A suitable solution comprising chloride ions is a solution comprising sodium or potassium chloride or hydrochloric acid. Desirably the solution comprises either chloride or both bicarbonate and chloride ions.

The solution comprising bicarbonate ions generally comprises up to 1M bicarbonate ions, preferably from 0.75 to 0.9M bicarbonate ions. The solution comprising chloride ions generally comprises up 2M chloride ions, preferably from 1 to 2M chloride ions. When both bicarbonate and chloride ions are used, the solution generally comprises up to 1M, preferably 0.75 to 0.9M, bicarbonate ions and up to 2M, preferably 0.3M to 2M, chloride ions.

After the aqueous solution has passed through the ion exchange column (a) it comprises nitrate ions and either or both of bicarbonate and chloride ions. The solution is then passed through an electrochemical cell to convert the nitrogen ions to nitrogen gas in accordance with the method of the present invention defined above.

The solution exiting the electrochemical cell is recycled bask to the ion exchange column (a). However, it is necessary to replenish the solution by adding bicarbonate and/or chloride ions thereto. In order to add bicarbonate ions further sodium bicarbonate or potassium bicarbonate may, for example, be added. However, this is not preferred since it allows a build-up of hydroxide ions in the regenerant which leads to a rise in the level of hydroxides, such as calcium hydroxide and magnesium hydroxide, which precipitate out in the column during normal processing of water. Therefore it is more desirable to bubble carbon dioxide gas through the solution to convert the hydroxide ions, produced as a by-product from the reduction of nitrate ions, to bicarbonate ions. To replenish the chloride ions it is generally appropriate simply to add sodium or potassium chloride or hydrochloric acid.

Once the anion exchange resin has been regenerated the ion exchange column (a) may be used again for the removal of nitrate ions from water containing nitrate ions. Thus steps (i) and (ii) may be, if desired be repeated at least once. Of course, in practice, the process may be repeated again and again many times.

The water being treated by the ion exchange column may contain impurities apart from nitrate ions. In order to ensure that these anions do not adversely affect with the process of the present invention, the anion exchange resin is a nitrate selective anion exchange resin so that it exchanges the nitrate ions in water preferentially over other anions such as sulphate and phosphate.

The process of the present invention can, therefore, be carried out on water which also comprises other anions. Thus, for instance, especially when the water also comprises, for example, sulphate, chloride or phosphate ions, the process may additionally comprise i) passing the outflow from the ion exchange column (a) through an ion exchange column (a) containing an ion exchange resin to exchange any nitrate ions in the outflow with bicarbonate and/or chloride ions until substantially the nitrate concentration in the outflow from ion exchange column (a) is equal to the nitrate concentration in the inflow to ion exchange column (a); and ii) removing the ion exchange column (a) from the flow of water by passing the water directly into the ion exchange column (b).

The nitrate concentration can be measured continuously or non-continuously by any one of the methods known in the art.

The above embodiment ensures that the water may be continuously treated. Thus the removal of nitrate ions, and hence the treatment of the water flow, does not have to be stopped while a single ion exchange column is regenerated. Desirably the ion exchange column (a) is regenerated and the outflow from the ion exchange column (b) is then optionally passed through another ion exchange column. This may be the regenerated ion exchange column (a).

Another possibility is to have more ion exchange columns. If the total number of columns is n, the water is generally only passed through n–1 columns at a time. Thus, for example, 3 or 4 ion exchange columns may be used, but with the water only passing through 2 or 3 of them at a time. The remaining column will have been taken out of the water processing circuit and will be in the process or being regenerated. Thus, if 3 columns are used, a snap shot of the operation could show 2 columns processing water separately in parallel and the third column being regenerated, or in stand-by (i.e. ready to be used in series after one of the other columns).

Thus, as one embodiment of the invention, initially the water passes through ion exchange column (a) until nitrate levels in the effluent are seen to increase, indicating breakthrough. Ion exchange column (b) is then added in series to ion exchange column (a) (or it may previously have been attached in series) and water passed through both columns until the nitrate level in the effluent from column (a) is seen to be substantially identical to the level in the water fed into ion exchange column (a), indicating maximum nitrate absorption on column (a). Water is then passed only through column (b) and column (a) is regenerated. After ion exchange column (a) has been regenerated, the water continues to be passed through ion exchange column (b) until nitrate levels in the effluent from this column are seen to increase, indicating breakthrough. Ion exchange column (a) (or another ion exchange ion column (c) if ion exchange column (a) is still being regenerated, for example) is then added in series to ion exchange column (b) and water passed through both columns until the nitrate levels in the effluent from ion exchange column (b) is seen to be substantially identical to the level in the water fed into ion exchange column (b), indicating maximum nitrate absorption in ion exchange column (b). Water is then passed only through ion exchange column (a) (or ion exchange column (c)) and ion exchange column (b) is regenerated.

Of course, this embodiment may be modified so that ion exchange columns are taken out of the water flow before they have maximum nitrate absorption if desired. This arrangement may be modified by including more ion exchange columns in the series. In general three or four ion exchange columns are used in a "merry-go-round" arrangement.

The present invention is further described in the following Examples and Comparative Example.

EXAMPLES

In all of the following Examples a simple bipolar cell was constructed from a plastic sheet having internal dimensions of 19.5 cm (length), 9 cm (width) and 12 cm (height). The working volume, i.e. liquid volume, was 1.5 litres.

The cell was fitted with an electrode at either end and a direct current power supply was connected. In addition up to 24 intermediary electrodes sized 9.1 cm (width) and 11.5 cm (height) with small slots about 0.2 cm deep along one side only could be fitted between the end electrodes by placing them in slots in the side plates of the cell. The electrodes were arranged so that the slots opposed each other between adjacent electrodes, ensuring a tortuous liquid flow path through the cell. No direct electrical connection was made to these electrodes.

The cell was fitted with a lid and operated at a constant liquid volume by periodically venting gas produced at the electrodes through a gas valve. This was directly linked to a liquid level switch giving automatic level control. The liquid level was maintained below the top of the intermediary electrodes with about about 10 cm of each electrode immersed in the liquid. Liquid was pumped into the cell through a plastic tube at one end of the cell and pushed out of the cell into a plastic tube at the opposite end of the cell. The output liquid was passed through a heat exchanger to transfer residual heat to the feed liquid. The feed liquid was also passed through a second heat exchanger so the inlet temperature to the cell could be controlled.

Example 1

The cell was fitted wish 24 1.2 mm thick commercial purity nickel sheet electrodes electrolytically coated on the cathode surfaces with a 0.5 $\mu$m thick coating of rhodium metal. The cathode end electrode was similarly coated with rhodium. The feed liquid was water containing 32 g/l NaOH with 11,600 ppm nitrate in solution as sodium nitrate. The flow rate was 1 l/h and the inlet temperature was controlled at 75° C. At a constant current of 1 A (equivalent to a current density of 11 mA/c$^2$), nitrate levels were reduced to 9,500 ppm in a single pass through the cell. The electrical efficiency was about 37%, with power costs of about 7.4 Wh/g nitrate reduced.

COMPARATIVE EXAMPLE 1

The same cell was fitted with 10 1.2 mm thick titanium sheet electrodes coated on both surfaces with a 2 $\mu$m thick coating of mixed titanium and ruthenium oxides. The end electrodes were also titanium sheet coated with a 2 $\mu$m thick coating or mixed titanium and ruthenium oxides. The feed liquid was water containing 63 g/l sodium bicarbonate with 8,900 ppm nitrate in solution as sodium nitrate. The flow rate was 1.5 l/h and the inlet temperature was controlled at 75° C. At a constant current of 0.8 A (equivalent to a current density of 9 mA/cm$^2$), nitrate levels were reduced to 7,600 ppm in a single pass through the cell. The electrical efficiency was about 40%, with power costs of about 9 Wh/g nitrate reduced.

Example 2

The same cell was fitted with 10 1.2 mm. thick titanium sheet electrodes coated on the anode surfaces with a 2 $\mu$m thick coating of mixed titanium and ruthenium oxides and on the cathode surfaces with a 0.5 $\mu$m thick coating of rhodium metal. The end electrodes were also titanium sheet coated with a 2 $\mu$m thick coating of mixed titanium and ruthenium oxides an the anode and a 0.5 $\mu$m thick coating of rhodium metal on the cathode. The feed liquid was water containing 63 g/l sodium bicarbonate with 8,800 ppm nitrate in solution as sodium nitrate. The flow rate was 1.5 l/h and the inlet temperature was controlled at 75° C. At a constant current of 1.3 A (equivalent to a current density of 14.5 mA/cm$^2$), nitrate levels were reduced to 6,650 ppm in a single pass through the cell. The electrical efficiency was about 49%, with power costs of about 8.4 Wh/g nitrate reduced.

Example 3

The improved performance of a rhodium surface on the cathode as compared to a platinum surface is shown by a voltametric experiment.

Polypropylene beakers were filled with an aqueous solution of 120 g/l NaOH with additions, as indicated below, of sodium nitrate and sodium nitrite. Cathodes consisting of 1 mm diameter wire were immersed to the same depth to give identical surface areas in each experiment. Anodes were of platinum. The temperature was kept constant. The voltage was swept from (with platinum) +0.45 V (all voltages vs SCE) and (with rhodium) −0.2 V to −1.1 V at sweep rates of 50 mVs$^{-1}$.

With both platinum and rhodium cathodes and with no nitrate present, the traditional "butterfly pattern" associated with hydrogen adsorption and desorption was seen at −0.9 V, with hydrogen gas evolution starting to occur at −1.1 V. There was no significant difference between rhodium and platinum.

51 g/l of sodium nitrate was added to 120 g/l sodium hydroxide and the above experiments were repeated.

With a platinum cathode, a current peak of 4.5 mA was observed at −0.68 V on the negative potential sweep, indicating adsorption of nitrate. This peak wad not seen on the positive potential sweep, indicating interference in the adsorption of nitrate by hydrogen desorption. In addition, the peak width on the negative sweep was 0.1 V at a current of 2 mA.

With a rhodium cathode, a similar current peak was observed on the negative potential sweep with a lower peak (2.5 mA) observed on the positive potential sweep. The peak width at 2 mA was 0.2V on the negative sweep and 0.1 V on the positive sweep.

This illustrates that adsorption of nitrate on rhodium is surprisingly not significantly affected by hydrogen desorption and that rhodium is superior to platinum for the reduction of nitrate.

41.4 g/l of sodium nitrite was added to 120 g/l sodium hydroxide and the above experiments were again repeated.

With a platinum cathode, a current peak of 4.5 mA was observed at −0.92 V on the negative potential sweep, indicating adsorption of nitrite, with a slightly lower peak occurring on the positive potential sweep, indicating no significant interference in the adsorption of nitrite by hydrogen desorption.

With a rhodium cathode, the current peak was beyond the measuring range of the instrumentation. The nitrite levels were reduced to 0.23 g/l before the current peak was within range of the instrumentation. At this concentration, a peak current of 5.5 mA was observed with a peak shape indicative of a mass transfer limitation to the adsorption of nitrite. This illustrates that rhodium is again far superior to platinum for nitrite reduction.

The reduction of nitrate to nitrogen gas is known to proceed via the nitrite. An intermediate, ammonium nitrite, is formed which is thermally decomposed. Therefore the above experiments show that the efficiency when using a rhodium cathode is surprisingly greater then when using a platinum electrode. Furthermore they show that nitrite formation is minimised since the nitrite is easily reduced to ammonium ions. this is advantageous for water treatment processes where strict nitrite limits are applied.

What is claimed is:

1. A process for removing nitrate ions from an aqueous solution thereof which comprises passing the solution through an electrochemical cell comprising at least one anode and at least one cathode and passing a current therebetween, wherein the cathode surface(s) have been coated with a layer which consists of rhodium metal.

2. A process according to claim 1 wherein the cathode(s) comprise a metal coated with rhodium metal.

3. A method according to claim 1 wherein the cathode(s) comprise titanium or titanium coated with titanium dioxide and/or ruthenium dioxide, coated with rhodium metal.

4. A method according to claim 1 wherein the anode(s) comprise titanium coated with platinum, ruthenium or iridium or coated with titanium dioxide, ruthenium dioxide or oxides of platinum or iridium or mixed oxides of these metals.

5. A process according to claim 1 wherein the electrochemical cell is operated at a temperature of at least 60° C.

6. A process according to claim 1 wherein the solution has been obtained from the regeneration of an ion exchange column.

7. A process for the removal and destruction of nitrate ions from water which comprises:

i) passing the water through an ion exchange column (a) containing a nitrate selective anion exchange resin to exchange the nitrate ions with bicarbonate and/or chloride ions; and ii) destroying the nitrate ions and regenerating the ion exchange column (a) by:

a) removing from the ion exchange column (a) any cations which form insoluble hydroxides or carbonates;

b) passing an aqueous solution comprising bicarbonate and/or chloride ions through the ion exchange column (a) to exchange the nitrate ions with bicarbonate and/or chloride ions;

c) passing the solution from step (b) through an electrochemical cell to convert the nitrate ions to nitrogen gas by a method as defined in any one of claims 1 to 5;

d) replenishing the solution from step (c) by adding bicarbonate and/or chloride ions thereto; and e) recycling the solution from step (d) to step (b).

8. A method according to claim 7 wherein the solution from step (c) is replenished by bubbling carbon dioxide gas through the solution to convert the hydroxide ions produced as a by-product from the reduction of nitrate ions to bicarbonate ions.

9. A method according to claim 7 wherein the solution from step (c) is replenished by adding sodium or potassium chloride or hydrochloric acid.

10. A method according to claim 7 wherein the solution from the output of the electrochemical cell is recycled to the ion exchange column (a) until all of the nitrate ions have been exchanged with the bicarbonate and/or chloride ions.

11. A process according to claim 7 wherein the solution comprising bicarbonate ions is a solution comprising sodium or potassium bicarbonate.

12. A process according to claim 7 wherein the solution comprising chloride ions is a solution of sodium or potassium chloride.

13. A process according to claim 7 wherein the solution comprising bicarbonate and/or chloride ions comprises up to 1M bicarbonate ions and/or up to 2M chloride ions.

14. A process according to claim 7 wherein the solution comprises up to 1M bicarbonate ions and up to 0.6M chloride ions.

15. A process according to claim 7 wherein the water which is passed through the ion exchange column (a) is ground water or surface waste.

16. A process according to claim 7 wherein the water which is passed through the ion exchange column (a) also comprises other anions, which process additionally comprises:
   i) passing the outflow from the ion exchange column (a) through an ion exchange column (b) containing an ion exchange resin to exchange any nitrate ions in the outflow with bicarbonate and/or chloride ions until substantially the nitrate concentration in the outflow from ion exchange column (a) is equal to the nitrate concentration in the inflow to ion exchange column (a); and
   ii) removing the ion exchange column (a) from the flow of water by passing the water directly into the ion exchange column (b).

17. A process according to claim 7 wherein the ion exchange column (a) is regenerated and the outflow from ion exchange column (b) is passed through the regenerated ion exchange column (a).

* * * * *